C. F. HARLOW & E. F. PERRY.
MACHINE FOR CUTTING HAIR, GRASS, &c.
No. 65,077. Patented May 28, 1867.
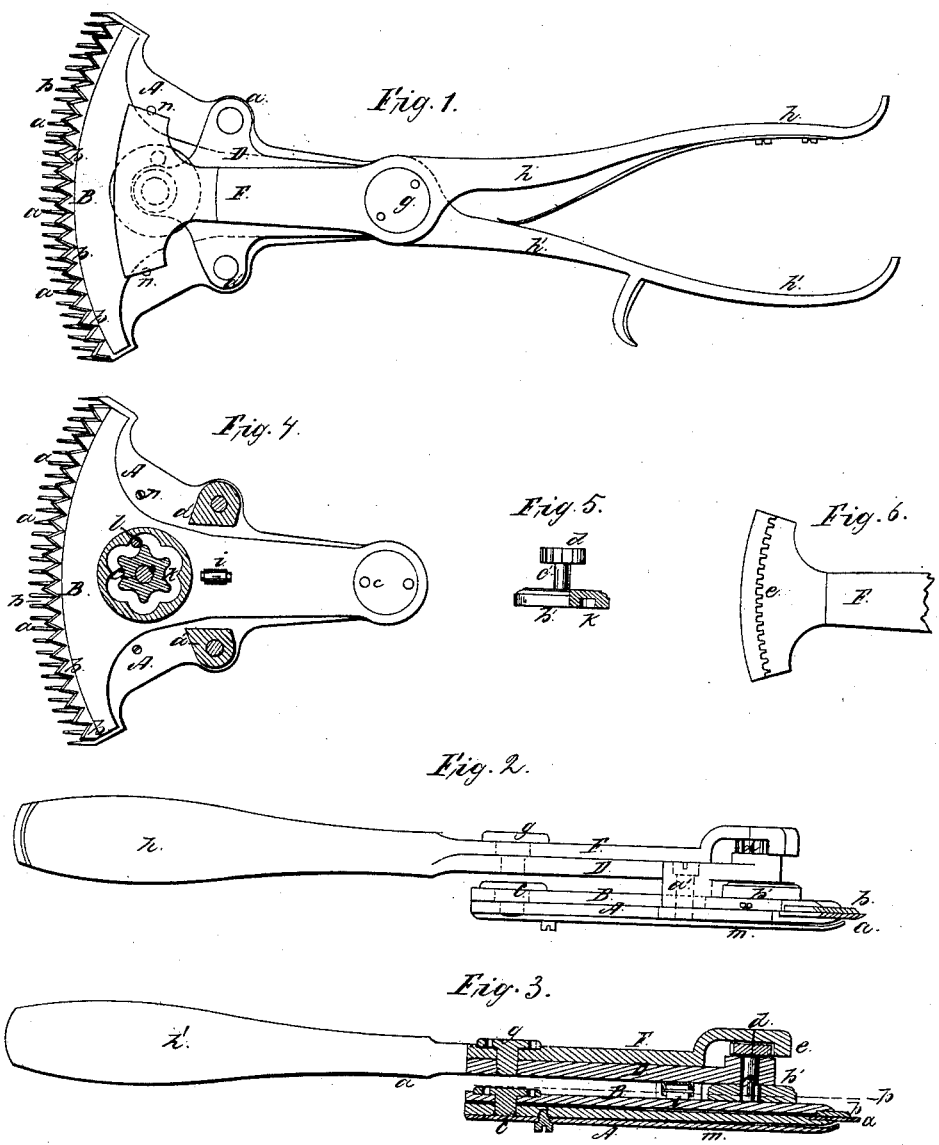

United States Patent Office.

CHARLES F. HARLOW, OF BOSTON, AND EDWIN H. PERRY, OF ROXBURY, MASSACHUSETTS.

*Letters Patent No. 65,077, dated May 28, 1867.*

---

MACHINE FOR CUTTING HAIR, GRASS, &c.

---

*The Schedule referred to in these Letters Patent and making part of the same.*

---

TO ALL WHOM IT MAY CONCERN:

Be it known that we, CHARLES F. HARLOW, of Boston, in the county of Suffolk, and State of Massachusetts, and EDWIN H. PERRY, of Roxbury, in the county of Norfolk, and State aforesaid, have invented an improved Machine for Cutting or Shearing Hair, Grass, &c.; and do hereby declare the following to be a full, clear, and exact description thereof, due reference being had to the accompanying drawings, making part of this specification, and in which—

Figure 1 is a plan or top view.

Figure 2, a side elevation.

Figure 3, a vertical and longitudinal section, and

Figure 4 a horizontal section, of a machine constructed in accordance with our invention.

Figure 5 is a side elevation of the actuating cam and its pinion as detached from the machine.

Figure 6 is an inside view of the actuating lever and its sectoral rack.

The object of this invention is to produce a simple and effective machine or implement for cutting or shearing the hair or coats of animals, or grass or other fibrous substances, and one capable of being operated by one hand, when adapted, as in the present instance, to the purposes of shearing the coats of animals.

The invention consists of two sectoral plates, one having a toothed and the other a serrated edge, pivoted together face to face, and so operated by a rack and pinion and cam groove applied to two actuating levers or handles pivoted together and surmounting the two plates, that the serrated plate shall describe a number of reciprocating movements over the surface of the toothed plate to one movement (either opening or closing) of the handles or operating levers, thus gaining a very quick movement of the cutters to a slow one of the handles.

For the drawings above referred to as illustrating my invention, A denotes a stationary sectoral plate, having its perimeter formed into a comb or series of teeth, $a\ a\ a$, &c., for the purpose of supporting the substance to be cut, and guiding it to the teeth $b\ b\ b$, constituting the serrated edge or perimeter of a movable plate, B, pivoted to the first-mentioned plate A by a turning pin or post, $c$, and so as to be capable of easily turning thereon and moving upon the upper surface of the plate A. Surmounting the two plates A B, and securely fixed to the lower one A, by means of offsets $a'\ a'$, which embrace the upper plate, is a bar, D, carrying at its forward end a circular head or disk, $b'$, disposed between it and the plate B, and supported by a journal, $c'$, which passes upward through the said bar, and has a pinion, $d$, fixed to its upper end, which engages with a sectoral rack, $e$, fixed to the under surface of a vibrating lever, F, which rests upon the upper surface of the bar D, and is pivoted to it by a fulcrum-pin or bolt, $g$, upon which it freely turns. Both the bar D and lever F are furnished with handles $h\ h'$, similar to those of ordinary pliers, and having a spring placed between them to force them apart. A friction-roller, $i$, is interposed between the plate B and the bar D, and serving to diminish the friction between them, while at the same time pressing the two plates A and B together. The circular head or disk $b'$, before mentioned, has a cam or groove, $k$, cut in its lower face, which receives a stud, $l$, from the plate B, and serves to impart, by means of this stud, motion to the said plate. The shape of this cam-groove $k$, as shown in fig. 4 of the drawings, is a zigzag, circular channel, concentric with the axis of rotation of the disk. Each division of the groove causes a short, quick, reciprocating movement of the plate B on its axis, and upon the upper surface of the plate A. The rack and pinion are arranged in the present instance to cause about one revolution of the disk on its axis to one extreme length of movement of the handles. As the cam-groove is divided into six parts, the plate B will have six reciprocating movements imparted to it while the lever F is traversing the bar D and the handles $h\ h'$ are approaching each other, and as a consequence the same number of movements when the parts are returning. The number of divisions of the cam-groove may be diminished or increased in order to vary the rapidity of movements of the plate B. An adjustable spring-plate or gauge, $m$, is applied to the under side of the plate A, and is regulated by set-screws $n\ n$ inserted therein in such manner as to vary its distance from such plate in order to regulate the height of cut of the implement.

In operating with the above-described machine for the purpose of shearing the coats of animals, it may be used with one or both hands, as occasion or fancy may require, and with the surface of the gauge $m$ in contact with the animal's body. On bringing the two handles $h\ h'$ together the lever F will be moved over the surface of the bar D from left to right, and its rack $e$ so actuate the pinion $d$ as to cause a revolution of the disk $b'$ on its axis. This rotation of the disk, as before stated, will impart a quick reciprocating movement of the cutting teeth $b\ b$ over the comb formed by the teeth $a\ a$ of the lower plate A highly favorable to shearing hair, or wool, or any kindred material. On releasing the pressure of the hand upon the handles $h\ h'$ the spring will force them apart and cause a like number of movements of the plate B. When using the implement with both hands the spring will not be necessary, and it may or may not be used. When adapting the above-described invention to the purposes of a hand-mowing machine for cutting the grass upon lawns, croquet grounds, &c., the handles $h\ h'$ are to be lengthened and bent into the form very like the handles of an ordinary plough, by the aid of which the machine may be pushed over the surface of the turf and operated to great advantage. The principle of operating its cutting teeth or plates may be also applied to horse-mowing machines with equal advantage and value.

We claim—

1. So combining, arranging, and operating the two sectoral plates A B as to be enabled, when desirable, to operate them by one hand, essentially as described.

2. We claim combining the two plates A B and their operative mechanism in such manner as to obtain a number of reciprocating movements of the said cutter-plate B over the plate A to one movement of the handles $h\ h'$ or of the lever F, substantially in manner as set forth and explained.

3. We claim the mechanical construction of the machine substantially as above described, that is, the combination of the two plates A B, bar D, lever F, (provided with the handles $h\ h'$,) rack and pinion $e$ and $d$, and cam-groove $k$, in manner and to operate as specified.

4. We also claim the peculiar devices for operating the cutter-plate B, consisting of the rack $e$, applied to the lever F, the pinion $d$, and the disk $b'$, with its cam-groove $k$, operating in connection with a stud upon the cutter-plate, substantially in manner and to operate as described.

5. We claim the employment of the friction-roller $i$ for the purpose of keeping the two plates A B in contact and relieving the friction between the latter and the bar D, essentially as set forth.

CHARLES F. HARLOW,
EDWIN H. PERRY.

Witnesses:
C. W. BALDWIN,
CHAS. L. TURNER.